Aug. 15, 1967     J. E. GLAUSER ETAL     3,335,974
SAFETY HARNESS DEVICE
Filed Feb. 21, 1966     2 Sheets-Sheet 1
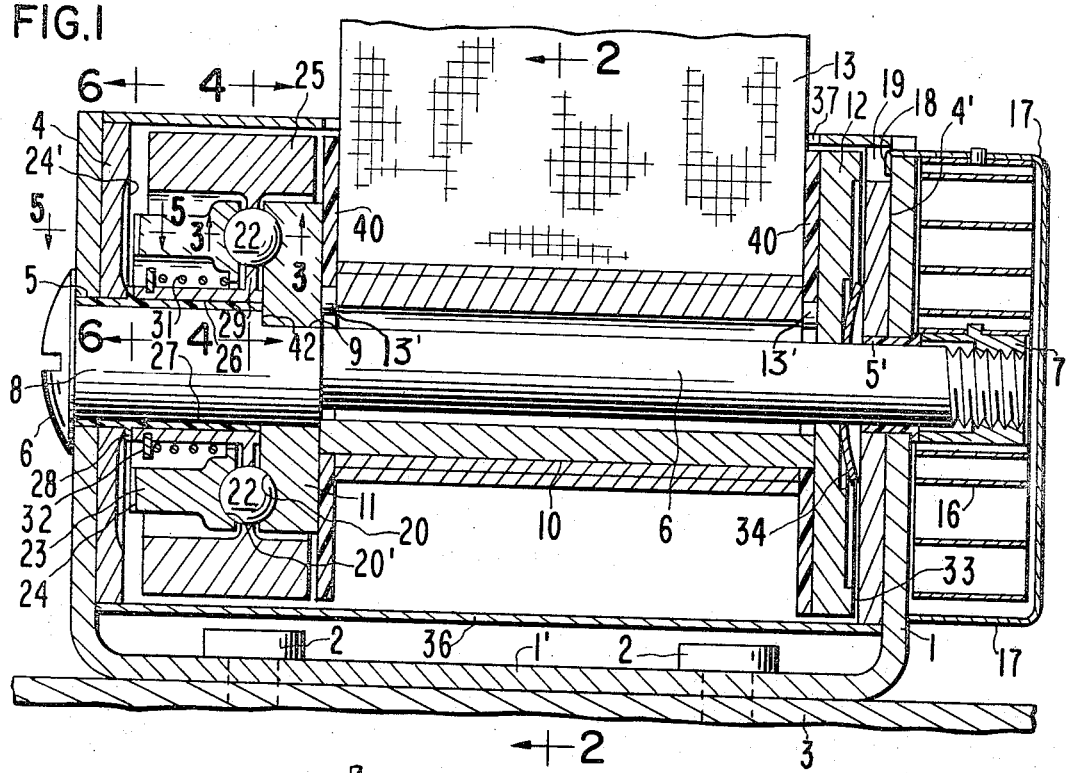
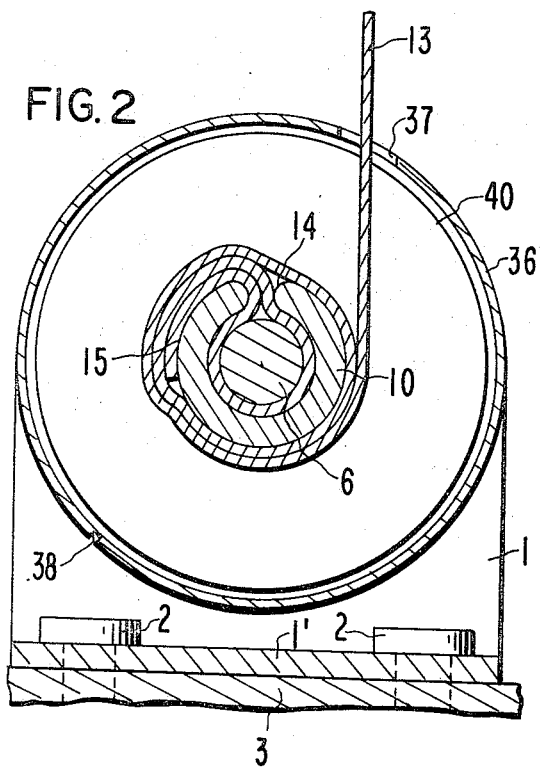
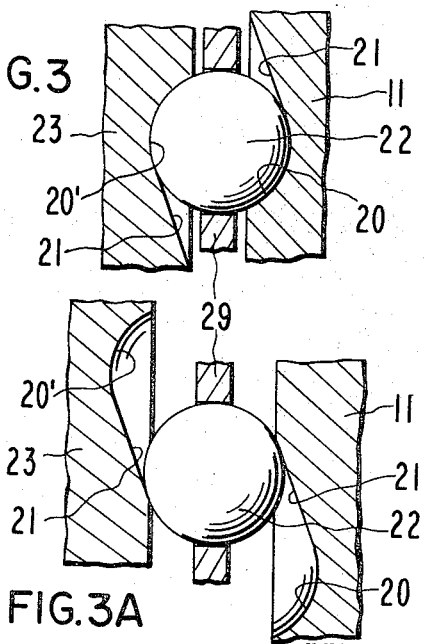
INVENTOR.
WILLIAM S. WRIGHT JR.
JAMES E. GLAUSER
BY Paul B. Hunter
ATTORNEY Aug. 15, 1967   J. E. GLAUSER ETAL   3,335,974
SAFETY HARNESS DEVICE
Filed Feb. 21, 1966   2 Sheets—Sheet 2
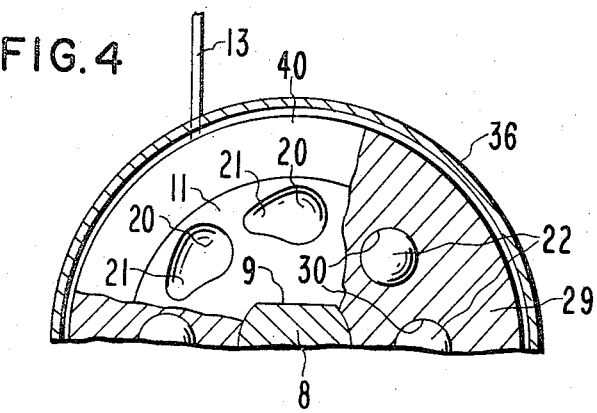
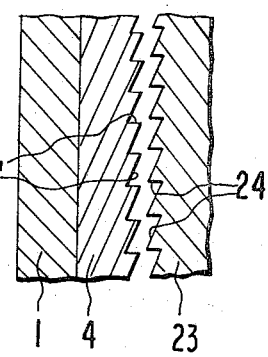
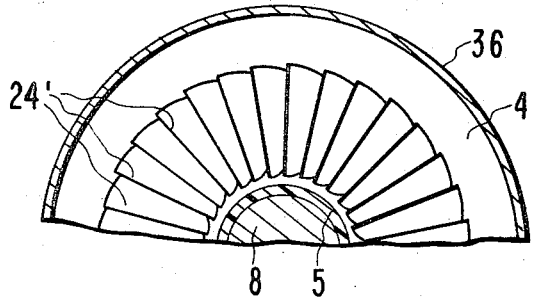
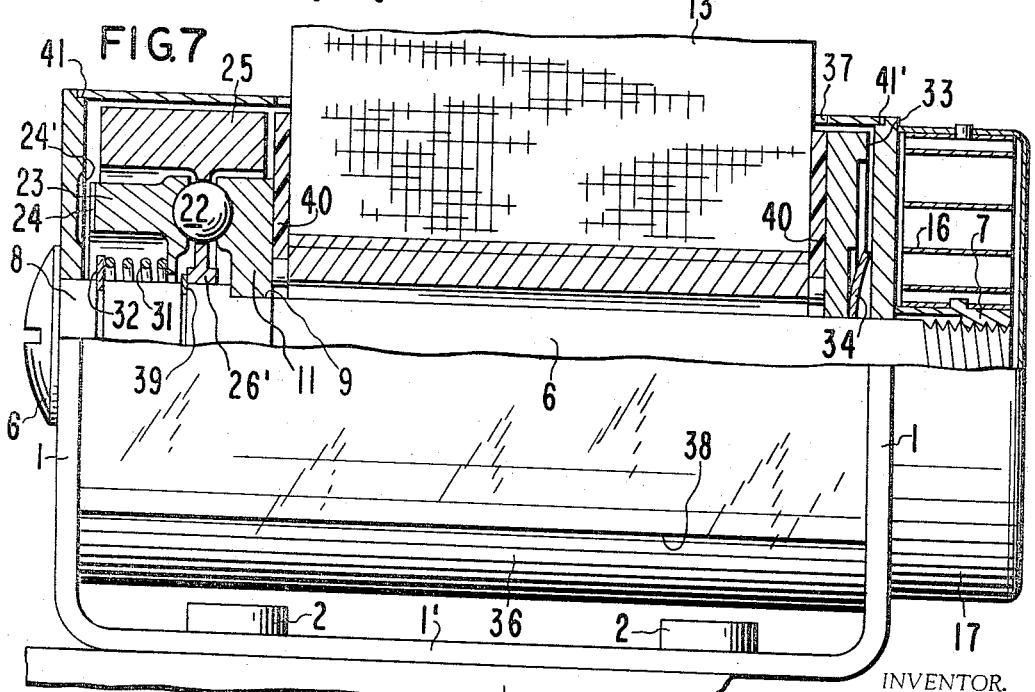
INVENTOR.
WILLIAM S. WRIGHT JR.
JAMES E. GLAUSER
BY Paul B. Hunter
ATTORNEY United States Patent Office 3,335,974
Patented Aug. 15, 1967

3,335,974
SAFETY HARNESS DEVICE
James E. Glauser, Santa Ana, and William S. Wright, Jr., Orange, Calif., assignors to Pacific Scientific Company, San Francisco, Calif., a corporation of California
Filed Feb. 21, 1966, Ser. No. 529,080
4 Claims. (Cl. 242—107.4)

This invention relates generally to a novel safety harness device for use by vehicle occupants such as occupants of automotive vehicles and aircraft, and the invention has reference, more particularly, to a novel inertia-operated, acceleration-responsive safety harness device which operates to automatically retain the user in his seat during crashes and the like.

Safety devices of the general type herein involved have been developed over the years and have been found useful on aircraft, road and rail vehicles, etc. Patent Nos. 2,845,233 and 3,058,687 disclose safety devices of the general type to which the present invention relates. These devices generally combine a casing containing a spindle-supported reel mounted to turn and having a strap automatically wound thereon and unwound therefrom in response to movements of the user, such reel normally driving a spring-loaded inertia member and cooperating locking means acting to lock the reel against rotation in case the strap, and hence the user, moves with respect to his seat at an excessive and dangerous acceleration.

In use, it has generally been necessary to mount these devices on the back of the seat of the user or in the vehicle in a position such that the spindle-supported reel is substantially horizontal in order to cause the device to operate uniformly at a desired set acceleration rate. Should the casing of the device be up-ended or inclined so that the reel is not horizontal, the effective weight of the spring-loaded inertia member varies so that the device will operate at a different acceleration from that set and hence becomes unreliable in use, and that is particularly objectionable in slower moving vehicles such as road vehicles, helicopters, etc., when the G setting of the device is generally lower than that in most aircraft.

The principal object of the present invention is to provide a novel safety harness device that is reliable in use and will operate at the acceleration rate for which it is set, regardless of the position in which the device is mounted in the vehicle.

A feature of the present invention is to provide a novel safety harness device of the above character wherein the inertia member is a fly-wheel that is positively restrained in the axial direction of its spindle so as not to put weight on its biasing spring in case its spindle is inclined in use or is subject to longitudinal accelerations, whereby the effective spring tension is substantially uniform at all times, resulting in positive locking of the device at the desired acceleration or G setting of the device.

Another feature of the invention is to provide a novel safety harness of the above character employing balls in tapered recesses to effect locking movement of a lock ring used to effect locking of the device, the inertia fly-wheel serving also as a cage for the balls to cause their positive actuation during the locking operation.

Still another feature of the invention is to provide a simple, rugged safety harness device wherein the end thrust created by the locking of this device is carried by the reel spindle rather than by the casing of the device, thereby simplifying the casing construction.

These and other features and advantages of the present invention will become more apparent after a perusal of the following specification taken in connection with the accompanying drawings wherein:

FIG. 1 is an enlarged side view of the novel safety harness device of this invention with parts broken away to illustrate the interior construction thereof;

FIG. 2 is a sectional view taken along line 2—2 of FIG. 1;

FIG. 3 is an enlarged fragmentary sectional view taken along line 3—3 of FIG. 1;

FIG. 3A is a view similar to FIG. 3 showing the parts in locked position;

FIG. 4 is a sectional view taken substantially along line 4—4 of FIG. 1;

FIG. 5 is a fragmentary sectional view taken along line 5—5 of FIG. 1;

FIG. 6 is a sectional view taken along line 6—6 of FIG. 1; and

FIG. 7 is a view similar to FIG. 1 of a somewhat modified construction.

Similar characters of reference are used in the above figures to designate corresponding parts.

Referring now to FIGS. 1 through 6 of the drawings of this invention, the reference numeral 1 designates the frame or frame member of the device which is shown as of substantially U-shape, having a base 1' that is adapted to be secured as by fasteners 2 to a support 3, such as the back of the user's seat, the floor or ceiling of the vehicle, or perhaps the door jamb as where the device is used in a land vehicle such as an automobile. The inner sides of the legs of the base 1 are shown as having lock rings 4 and 4' secured thereto as by welding. The legs of base 1 and the lock rings 4 and 4' are centrally apertured with aligned apertures for receiving bearings 5 and 5', which bearings support a central rotatable spindle 6 illustrated in the form of a bolt having a nut 7 fixed on the threaded end portion thereof. The head portion of the bolt or spindle 6 is enlarged somewhat at 8 and is formed with a flat at 9 for retaining a reel 10 against rotation on the spindle 6, while permitting limited longitudinal movement of the reel on said spindle 6. Reel 10 has an end annular flange 11 that is centrally apertured to surround spindle 6 and is provided with a conforming flat engaging the flat 9 of the bolt spindle 6, whereby, as the reel 10 turns in use, it also turns the spindle 6 in bearings 5 and 5'. The reel 10 has a disc flange 12 at its other end, the flanges 11 and 12 being fixed upon the central portion of the reel 10 as by metal tongues 13'.

The interior cylindrical opening of the reel 10 is somewhat larger than the bolt or spindle 6, so that the end of a strap or other tensile member 13 may be inserted through a longitudinal slot 14 provided in the reel 10 and wrapped once around the spindle 6 and brought out and sewed as at 15 to the body of the strap 13, thereby securing the strap to the spindle 6 and reel 10 for wrapping around the latter, as illustrated in FIG. 2. A spiral tensile spring 16 has one end secured to the nut 7 and its other end secured to a spring cup 17 that is attached as by bent-over lugs 18 extending through openings in one leg of base 1 and conformably fitting in slots 19 of lock ring 4'. The spring 16 tends to wind the strap 13 upon the reel 10, the said strap 13 being connected to the harness of the user, whereby ordinary movements of the user are permitted due to unwinding and winding of the strap 13 upon the reel 10 as allowed by rewinding spring 16. Preferably, plastic washers or rings 40, as of polyethylene, are positioned on the reel 10 at the edges of the strap or web 13 to protect these edges from fraying in use.

The reel end flange 11 is provided with a series of angularly-spaced ball recesses or sockets 20 having tapered portions 21 (see FIGS. 3 and 4) for receiving balls 22. The balls 22 also are adapted to project into similar sockets or recesses 20' of a clutch ring 23 that surrounds the spindle 6 and which is shown having teeth 24 thereon for conformably engaging teeth 24' provided on the lock ring 4. Preferably, the clutch ring 23 is made of a light material such as aluminum, and the balls 22 are also preferably made of steel or of a light material such as an alloy of aluminum. A relatively heavy inertia member or flywheel 25 as of steel surrounds the flange 11 and clutch ring 23 and has a hub 26 turnably mounted on a bearing 27 fixed on head portion 8 of spindle 6 and interposed between the flange 11 and lock ring 4. The flywheel 25 has a radial web 29 interconnecting the outer flywheel mass and the hub 26, which web is provided with a series of angularly-spaced circular apertures 30 for conformably receiving the balls 22, as especially shown in FIGS. 1 and 4. This web serves as a cage for the balls 22 in use so that, when the flywheel 25 is displaced angularly with respect to the reel flange 11, it serves to force the balls 22 up the tapered portions 21 of the recesses 20 and 20', thereby forcing the clutch ring longitudinally with respect to spindle 6 so that its teeth 24 will engage teeth 24' of lock ring 4, as will further appear.

The flywheel bearing 27 is shown as having a radial flange 28 abutting the lock ring 4, which flange serves as a thrust bearing for the hub 26 of flywheel 25. Thus, when the spindle 6 is tilted on end, for example, the weight of flywheel 25 is carried through its hub 26 upon the bearing flange 28 or upon the flange 11 of the reel 10 so that flywheel 25 is positively restrained in the axial direction along spindle 6. A biasing compression spring 31 surrounds the hub 26 and is confined between the clutch ring 23 and a snap ring 32 fixed upon the hub 26. The pressure of this biasing spring 31 serves to urge the clutch ring 23 against the balls 22 to normally retain these balls in the deepest portions of their sockets 20 and 20'.

The disc flange 12 of the reel 10 is shown provided with an angular boss 33 adjacent its periphery for frictionally engaging the lock ring 4', as will further appear. An annular stiff cupped spring 34 surrounds the spindle 6 and presses lightly at its periphery against the lock ring 4' and at its inner portion against the disc flange 12 of reel 10, whereby this reel is urged towards the left as viewed in FIG. 1 thereby normally pressing flange 11 slightly against the shoulder 42 formed between flat 9 and the head portion 8 or spindle 6 and retaining the flywheel hub 26 against the radial bearing flange 28. A dust cover 36, having a slot 37 for accommodating the strap 13, is split longitudinally at 38 so that the same may be snapped readily over the lock rings 4 and 4' to protect the interior parts of the safety harness device against dust and dirt. This cover is easily removed when desired by expanding the same at the split 38.

In use, as the user moves about in his seat, the strap 13 will unwind and rewind to adjust to his movements. As the strap moves, it turns reel 10 and, since spring 31 retains the balls 22 in the deepest portions of their socket 20, 20', the flywheel 25, clutch ring 23 and spring 31 also turn. In the event, however, that the user is subjected to an excessive acceleration, such as due to crashes and the like, the user will move the strap 13 outwardly of the dust cover 36, the acceleration of the strap depending upon how rapidly the vehicle decelerates. The tension of biasing spring 31 determines the rate of acceleration at which the device will lock. The stiffer this spring, the higher the acceleration required. Assuming, for example, that the biasing spring 31 is set for the device to operate at 2 G's, when the strap 13 is pulled outwardly by the user at a rate of 2 G's, the inertia of flywheel 25 will act against the tension of spring 31 to hold the balls 22 against rotation, causing these balls to ride out of their slots 20 and 20' and forcing the clutch ring 23 towards the left as viewed in FIG. 1, thereby causing the engagement of its teeth 24 with cooperating teeth 24' in the lock ring 4, thus preventing further turning movement of the strap 13 to thereby retain the user in his seat.

If the load on the strap is not excessive, the teeth 24 and 24' are sufficient to hold the strap against further movement. However, in the event the tension on strap 13 increases greatly, the balls 22 will ride further out of their slots 20 and 20', thereby forcing reel 10 bodily towards the right, as viewed in FIG. 1, against the tension of the relatively stiff cupped spring 34, causing the angular boss 33 of flange 12 to abut the lock ring 4' so as to thereby lock both ends of the reel against turning. In this situation, it will be noted that the spindle 6 carries the full end thrust of the locking means, i.e., the thrust of clutch ring 23 against lock ring 4 and the thrust of boss 33 against lock ring 4', thus relieving the frame 1 from carrying this large force and permitting the frame 1 to be of relatively light construction, whereas, in devices as heretofore constructed, the casing of the device has had to take this thrust, requiring an excepionally strong expensive casing which is unnecessary when using the device of the present invention.

Since the balls 22 and the clutch ring 23 are of light construction, should the safety harness device of this invention be mounted with its spindle 6 vertical, for example, or inclined to the vertical, the biasing spring 31 is not loaded by the weight of the relatively heavy flywheel 25 and hence will operate accurately at the desired G value, which would not be true if the weight of the inertia flywheel 25 was carried by this spring as in prior art devices. Since the balls 22 are positively actuated by the flywheel 25, the locking action of the device of this invention is positive and hence reliable, particularly when used for slower moving vehicles, such as automobiles and other land or marine vehicles, wherein the device is set to operate at a relatively low acceleration. After locking, should the load on the strap 13 be removed, the springs 31 and 34 will operate to automatically unlock the reel, returning the same to normal operation.

In the form of the invention shown in FIG. 7, the structure is similar to that of the earlier figures except it is somewhat simplified and parts in this figure corresponding to earlier figures are similarly numbered. It will be noted that in this figure the lock rings 4 and 4' are omitted, bosses 41 and 41' formed on the legs of frame 1 taking their place. The clutch ring 23 locks directly against the boss 41 on leg portion of frame 1 and the angular boss 33 locks directly against the boss 41' of frame 1, thereby simplifying the construction. Furthermore, the device is made somewhat more compact, as is illustrated in the drawings. The hub 26' of the flywheel 25 is shortened and this shortened hub is retained in place by a snap ring 39 retained on the head portion 8 of the bolt 6. The operation of this device is similar to that of the earlier figures. It should be borne in mind that, while teeth 24 and 24' have been used in the figures herein shown, it is understood that teeth need not be used and the engaging surfaces of clutch ring 23 and lock ring 4 can be roughened or knurled or even made fairly smooth and still the device will function. Similarly, the opposed faces of boss 33 and lock ring 4' may be knurled or roughened, if desired.

Thus, in use it will be seen that the relatively high inertia of flywheel 25 is restrained in an axial direction by the bearing flange 28 in FIG. 1 or snap ring 39 in FIG. 7 and is free to rotate and act on the balls 22. The advantage of this construction is that the ratio of the system inertia, i.e., flywheel 25 to the spring mass, i.e., the lock ring 23 and balls 22, is high and reduces the axis sensitivity of the safety harness device, whereby lower accelerative settings of the device are made possible.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety harness device comprising a frame member, a spindle rotatable in said frame member, a reel having spaced annular end flanges supported on said spindle, a strap wound on said reel, said strap extending outwardly of said frame member for connection to the body of the user, a rewind spring connected between said frame member and said reel permitting unwinding of said strap and causing rewinding thereof during normal movements of the user in his seat, a clutch member opposite one end flange of said reel, said one end flange and clutch member having opposed tapered sockets, balls in said sockets, an annular inertia member having a rim portion surrounding said one end flange and clutch member, said inertia member having a web extending inwardly between said one end flange and clutch member and provided with recesses surrounding said balls for engaging the same, said inertia member having a hub portion turnably supported on said spindle, a biasing spring carried by said spindle and pressing against said clutch member, and friction means on said frame opposite said clutch member, said inertia member acting, upon the acceleration of the strap outwardly of said frame member beyond a predetermined rate determined by the force of said biasing spring, to force said balls to roll within said tapered sockets and cause movement of said clutch member against said biasing spring and away from said one reel end flange, effecting the binding of said clutch member against said frame member friction means and stopping the turning of said reel with respect to said frame member, to thereby limit outward movement of the strap and retaining the user in his seat.

2. A safety harness device as defined in claim 1 wherein said reel is mounted for limited axial sliding movement on said spindle, a stop on said spindle for limiting the axial movement of said reel in one direction toward said biasing spring, additional friction means provided on said frame opposite the other end flange of said reel, stiff spring means interposed between said other end flange and said frame for normally holding said reel at the limit of its travel on said spindle in said one direction, excessive pull on said strap after the binding of said clutch member against said frame member causing said balls to ride further along their tapered sockets with slight turning of said reel, thereby forcing said reel bodily away from said stop against the pressure of said stiff spring means and causing the other end flange of said reel to engage and bind upon said additional friction means, thereby stopping both ends of said reel and preventing further outward movement of the strap, the expansive forces thus applied to the ends of said frame member being carried by said spindle, whereby the stresses in said frame member are substantially limited to the pull of said strap.

3. A safety harness device as defined in claim 2 wherein said spindle is provided with stop means acting upon said inertia member hub portion for preventing the weight of said inertia member from deflecting said biasing spring in use, so that said safety harness device operates consistently at its G setting regardless of the position in which said device is installed in a vehicle.

4. A safety harness device comprising a frame member, a transversely extending spindle rotatable in said frame member, a reel supported upon said spindle and rotatable therewith, a strap wound on said reel, said strap extending outwardly of said frame member for connection to the body of the user, a rewind spring connected between said frame member and said spindle permitting unwinding of said strap and causing rewinding thereof during normal movements of the user in his seat, a clutch member surrounding one end portion of said spindle, a flange carried by said spindle and turnable therewith, said clutch member and said flange having opposed tapered sockets, balls in said sockets, an inertia member having a rim portion surrounding said flange and clutch member, said inertia member having a web extending between said flange and said clutch member and provided with apertures surrounding said balls for receiving the same, said inertia member having a hub portion turnably supported on said spindle, means for restraining said inertia member against axial movement on said spindle, a biasing spring carried by said spindle and pressing against said clutch member, and friction means on said frame opposite said clutch member, said inertia member acting, upon the acceleration of the strap outwardly of said frame member beyond a predetermined rate determined by the force of said biasing spring, to force said balls to roll within said tapered sockets and cause movement of said clutch member against said biasing spring and away from said flange, effecting the binding of said clutch member against said frame member friction means and stopping the turning of said reel with respect to said frame member, to thereby limit outward movement of the strap and retaining the user in his seat.

References Cited

UNITED STATES PATENTS

| 3,058,687 | 10/1962 | Bentley | 242—107.4 |
|---|---|---|---|
| 3,202,379 | 8/1965 | Wrighton et al. | 242—107.4 |
| 3,203,641 | 8/1965 | McFarlane et al. | 242—107.4 |

FRANK J. COHEN, *Primary Examiner.*

W. S. BURDEN, *Assistant Examiner.*